Sept. 21, 1926.　　　　J. F. SMATHERS　　　　1,600,252
TYPEWRITING MACHINE

Filed May 24, 1922　　　7 Sheets-Sheet 1

INVENTOR
JAMES F. SMATHERS

BY *A. D. T. Libby*
ATTORNEY

INVENTOR
JAMES F. SMATHERS
BY
A. D. T. Libby
ATTORNEY

Sept. 21, 1926.　　　　　　J. F. SMATHERS　　　　　　1,600,252
TYPEWRITING MACHINE
Filed May 24, 1922　　　7 Sheets-Sheet 3
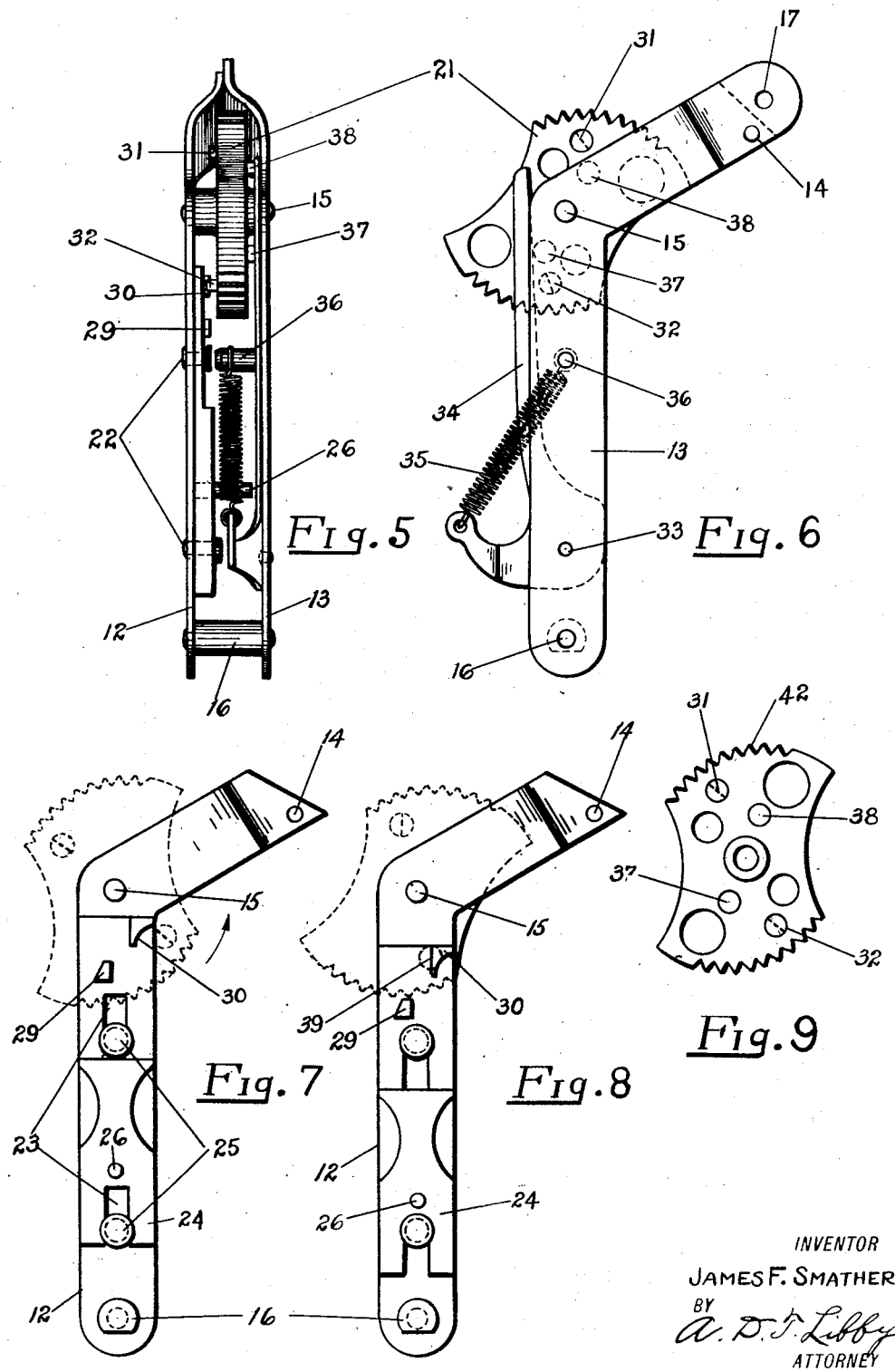
INVENTOR
JAMES F. SMATHERS
BY
A. D. T. Libby
ATTORNEY

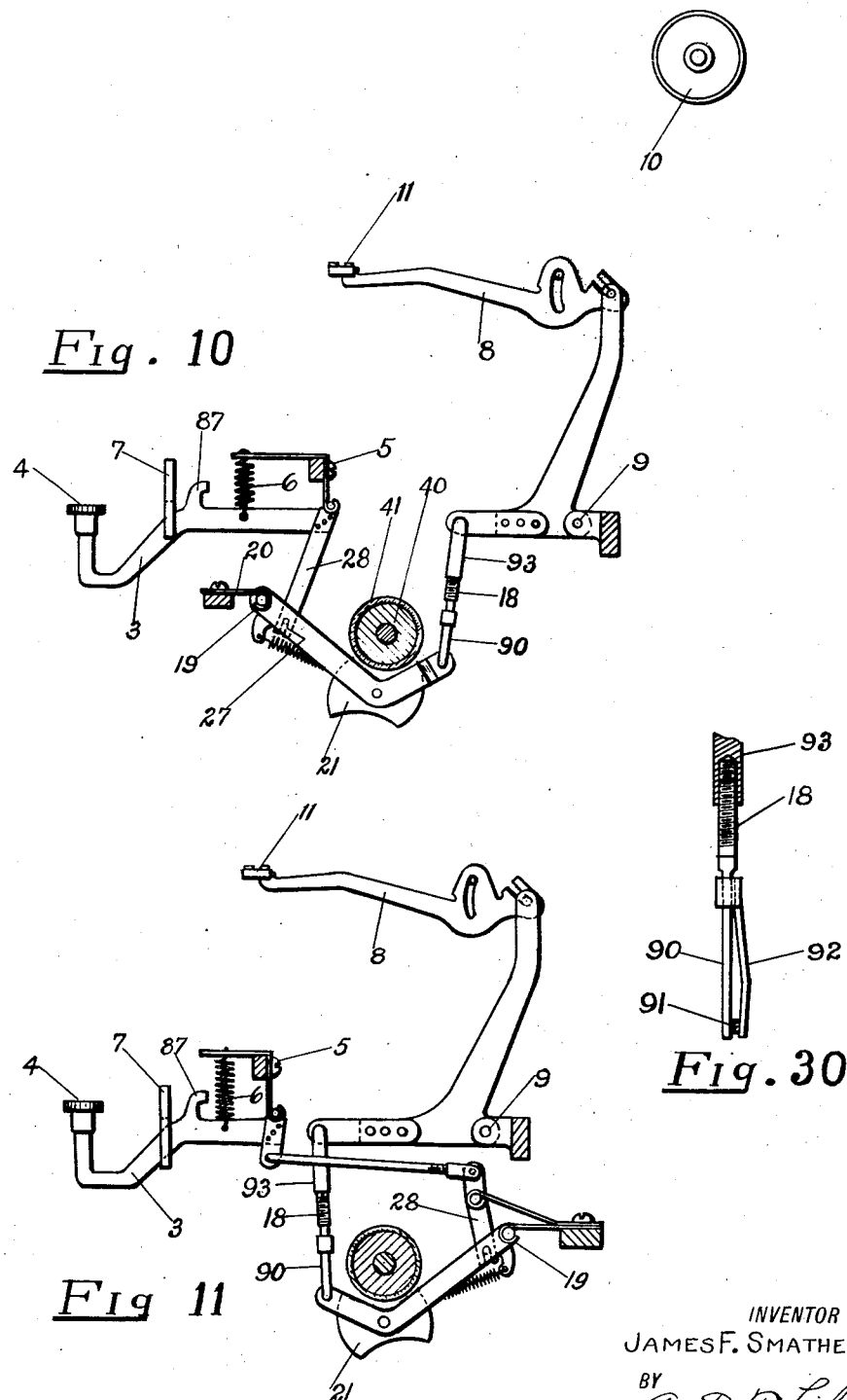

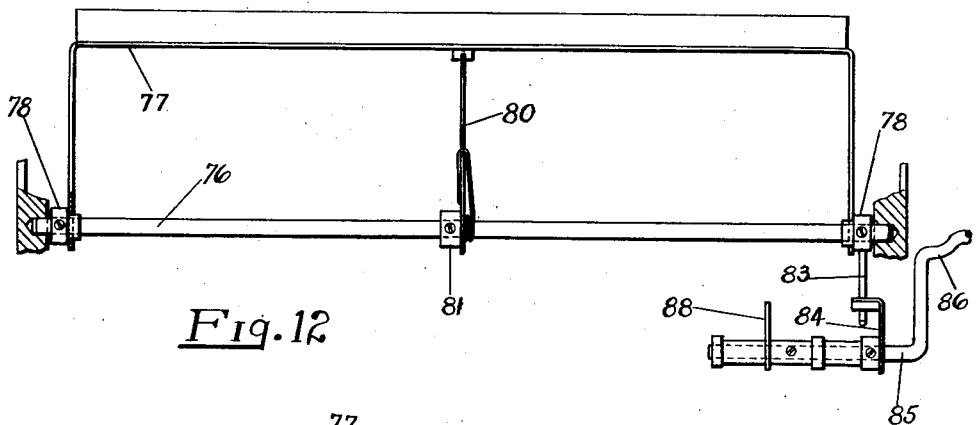
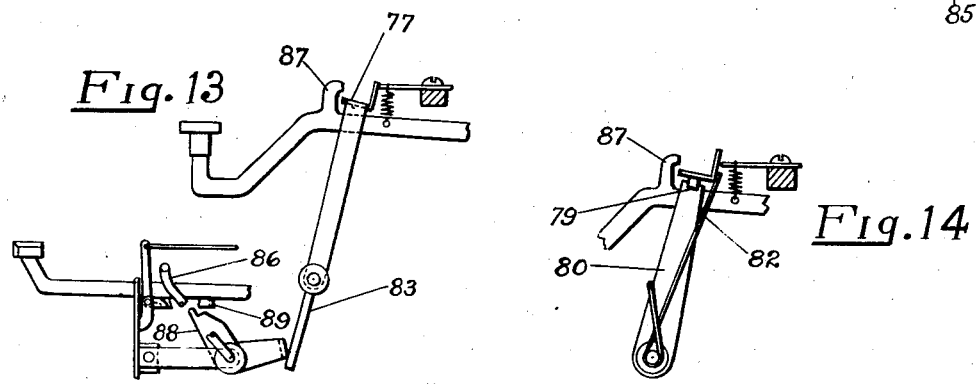
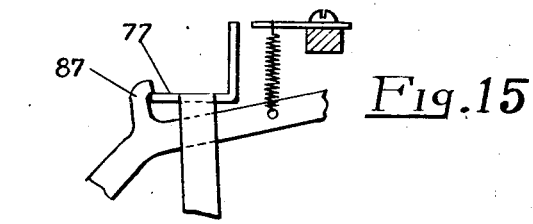

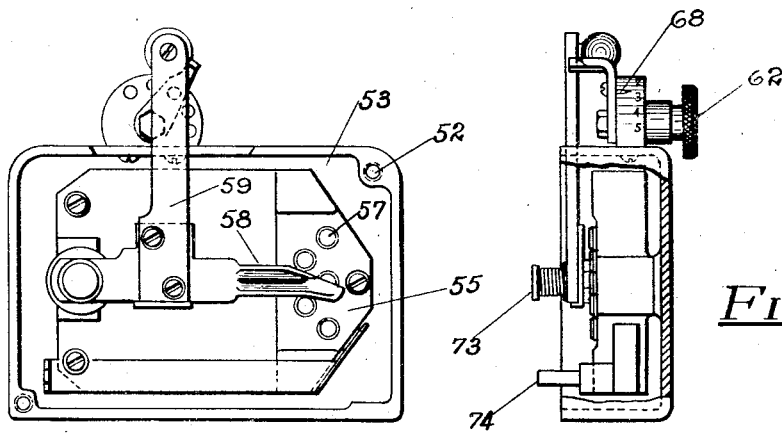
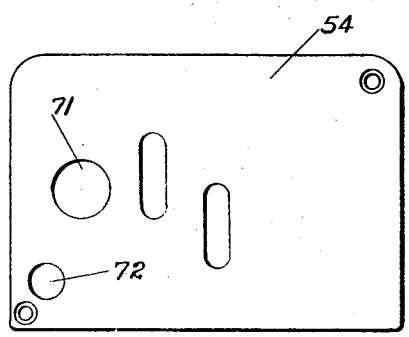
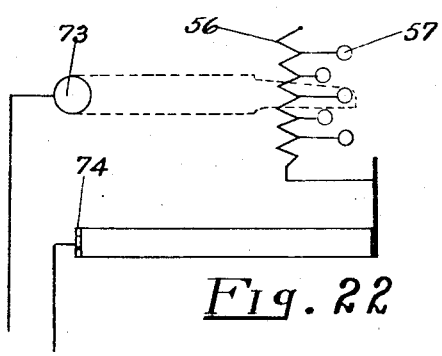
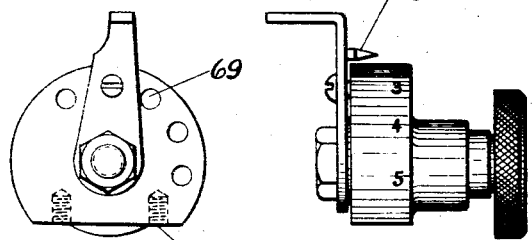
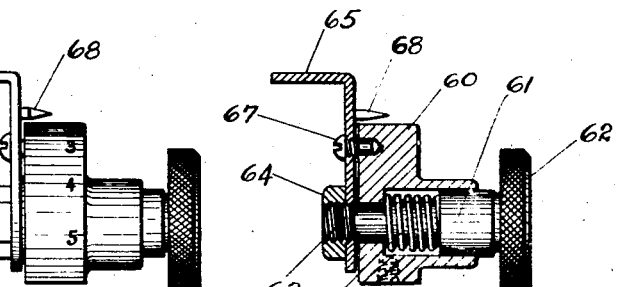
INVENTOR
JAMES F. SMATHERS Sept. 21, 1926. 1,600,252
J. F. SMATHERS
TYPEWRITING MACHINE
Filed May 24, 1922 7 Sheets-Sheet 7
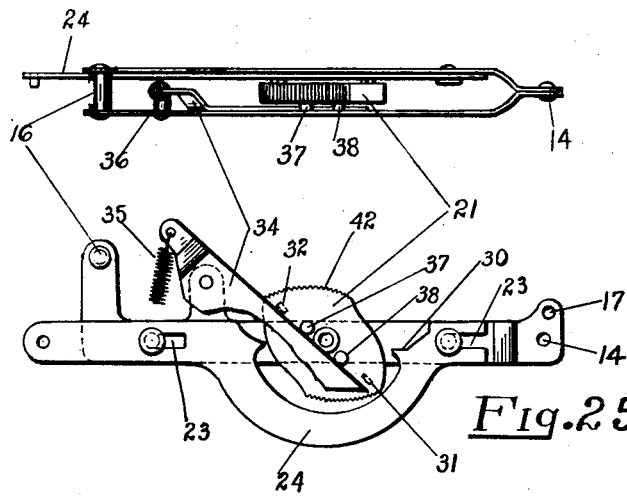
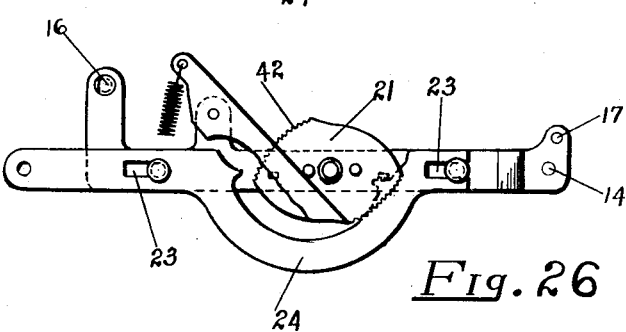
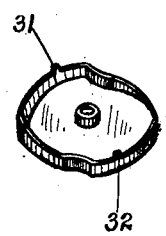
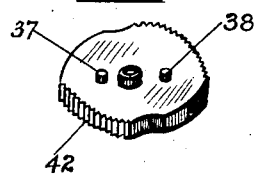
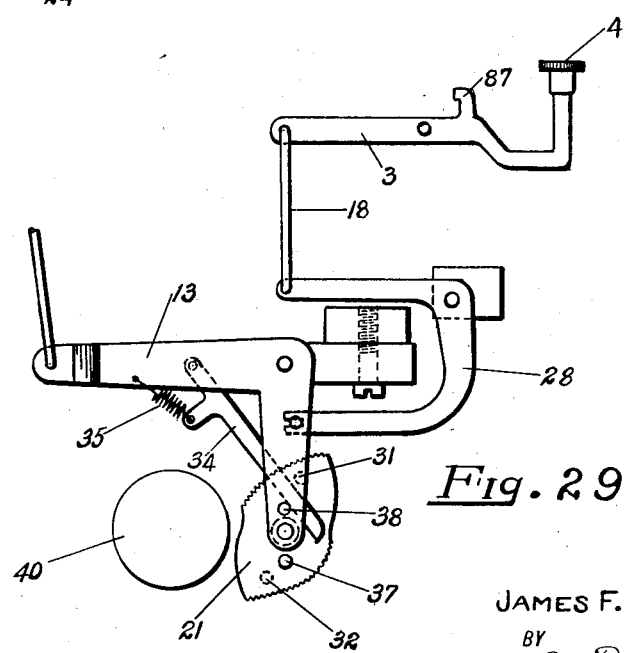
INVENTOR
JAMES F. SMATHERS
BY
A. D. T. Libby
ATTORNEY Patented Sept. 21, 1926.

1,600,252

UNITED STATES PATENT OFFICE.

JAMES FIELDS SMATHERS, OF KANSAS CITY, MISSOURI, ASSIGNOR TO SMATHERS POWER TYPEWRITER COMPANY, OF KANSAS CITY, MISSOURI, A COMMON-LAW TRUST OF MISSOURI.

TYPEWRITING MACHINE.

Application filed May 24, 1922. Serial No. 563,208.

This invention relates to typewriting machines in which the power for operating the type bars is supplied by some means other than the operator who merely has to release the key levers to set the other mechanism in operation. Hence it will be observed that the principal object of my invention is to provide a typewriting machine which will require less effort on the part of the operator, and therefore be less fatiguing and one in which the speed of operation is materially greater than on fully hand-operated machines.

It is another object of my invention to provide a machine in which the speed of operation or the power with which the type hits the printed page may be regulated and which will be uniform for any set point of operation.

Another object of my invention is to provide a unitary structure for the interconnecting device between the key levers and the type levers, which device is controlled by the key levers and operated by the power driven mechanism to actuate the type levers. While accomplishing this latter object, an ancillary object is to provide unitary structures which are interchangeable so that the units may be placed in any of the required positions and connected to any of the key or type levers.

A further object is to provide a unitary interconnecting device which may be quickly removed for the sake of inspection and repairs.

Another object of my invention is to provide a complete substructure for the typewriting machine, which substructure carries the unitary interconnecting devices, as well as the power supply and control means.

A further object of my invention is to provide a locking means whereby all of the key, and consequently type levers, can be locked when the typewriting machine is not in use.

A further object is to provide controlling means controlling the locking means, while at the same time controlling the power means.

Certain of these objects are referred to in my previous Patents 1,077,005 issued October 28, 1913 and 1,227,846 issued May 29, 1917, but my present invention is an improvement over the subject matter of said patents and it will, therefore, be observed that other and further objects than those above referred to will be apparent after a study of the following specification taken in connection with the annexed drawings, in which:

Figure 5 is a view on an enlarged scale of one of the unitary connecting devices such as shown in Fig. 1.

Figure 6 is a side view of Fig. 5 showing the operating member set or in position ready to be tripped.

Figure 7 is a view of part of the unitary structure as illustrated in Fig. 6, but with the top side member removed and the operating member shown dotted in tripped position.

Figure 8 is a view similar to Fig. 7 but with the parts in different position.

Figure 9 shows a separate view of the operating member illustrated in Figs. 5 to 8, inc.

Figure 10 is a view on a reduced scale, somewhat diagrammatic in form, illustrating a key lever of the front set of keys of an Underwood machine with the interconnecting unitary structure together with the paper roll.

Figure 11 is a similar view to Fig. 10 of one of the back set of levers.

Figure 12 is a view on a reduced scale of the locking lever and means for operating the same and locking the key levers to prevent their actuation.

Figure 13 shows the application of the locking lever illustrated in Fig. 12 to the key bars as well as to the spacer bar.

Figure 14 is a side view of the control arm and a portion of the locking lever shown at the central part of Fig. 12.

Figure 15 is an enlarged view showing the locking lever in position to lock the key levers so that they cannot be operated.

Figure 17 shows a bottom view of the rheostat for controlling the electric motor as well as the control mechanism which limits the movement of the rheostat.

Figure 18 is an end view of Fig. 17 with the wall of the rheostat casing broken away.

Figure 19 is a view of the back plate of the rheostat casing.

Figure 20 is a view of the lever controlling the position of the rheostat handle on a scale enlarged from that shown in Fig. 18.

Figure 21 is a left hand end view of Fig. 20, while

Figure 22 is a diagram of the wiring of the rheostat controlling the electric motor.

Figure 23 is a vertical section through Fig. 20, and

Figure 24 is a view similar to Fig. 5 but of a modified form of unitary interconnecting device.

Figure 25 is a side view of Fig. 24 with the front side member removed.

Figure 26 is a view similar to Fig. 25 but with the parts in different position.

Figure 27 is one view of the operating member shown in Figs. 24—26, inclusive; while Figure 28 is a view of the back of Fig. 27.

Figure 29 is a modified form of an interconnecting device in which the driving rolls are so positioned as to be gotten at without removing the unitary interconnecting devices which are shown in Fig. 1.

Figure 30 shows a detail of the means of connecting the type lever to the unitary operating device.

Figure 1:
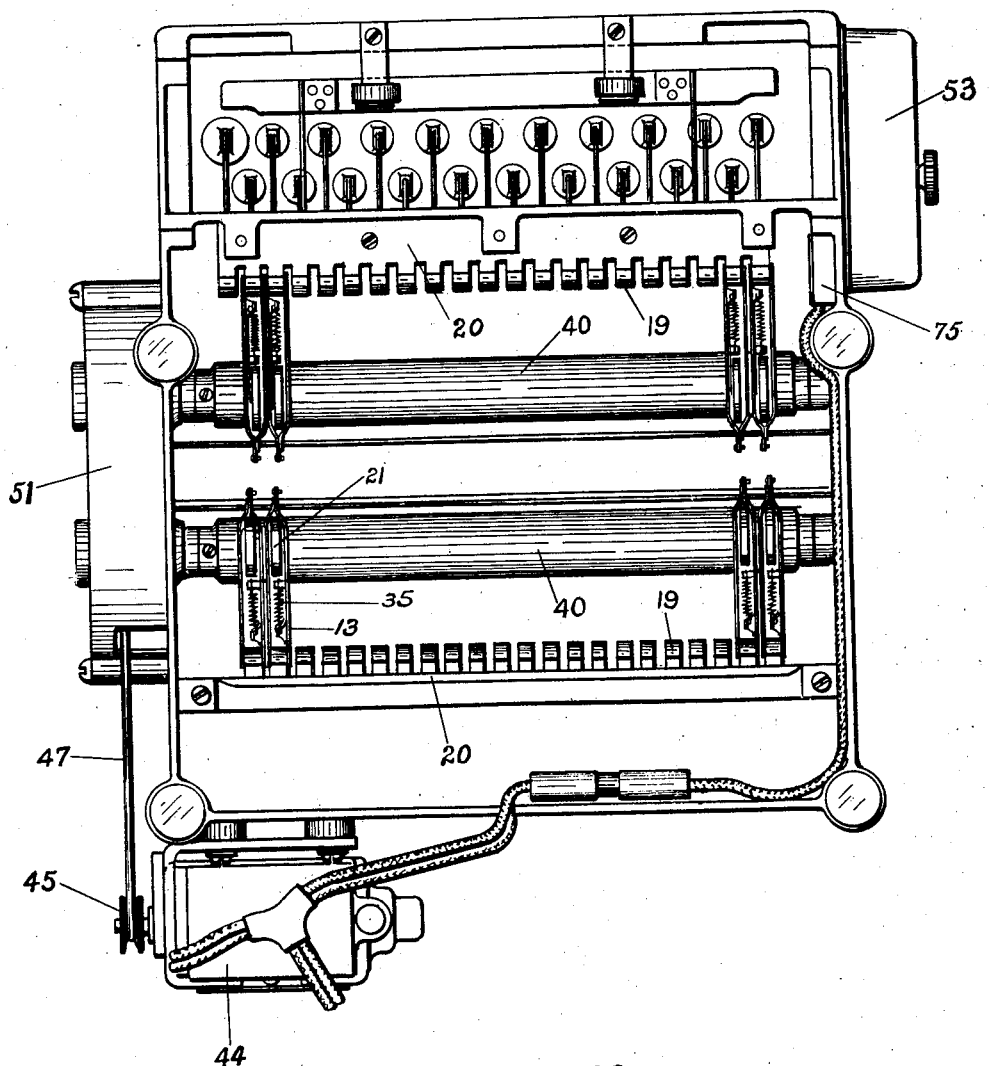
Figure 1 is a bottom view of the typewriting machine showing the power operating means and a part of the unitary structure devices, which interconnects the key and type levers.

Referring now to the details, wherein like mumbers refer to corresponding parts in the various views, 1 denotes the framework of a typewriting machine, having the usual key shelf 2 with a series of key levers 3 and buttons 4. The key levers 3 are illustrated as pivoted to a portion of the frame 5 and have restoring springs 6, the levers 3 being separated by the comb 7 in the usual way. Type levers or bars 8 are pivoted at 9 to the framework of the machine. The paper roll 10 is indicated to cooperate with the type 11 carried on the type lever 8.

Figure 16:
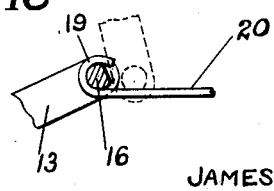
Figure 16 is an enlarged view showing the method of attaching the unitary interconnecting device to a part of the framework of the typewriter.
Figure 2:
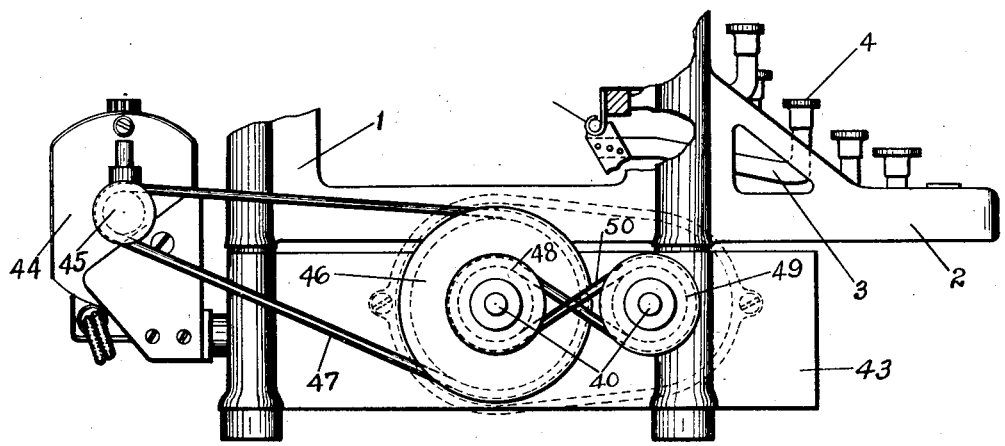
Figure 2 is a part end view of the typewriting machine showing an electric motor connected to the driving parts or rolls.

As a means of interconnecting the key levers 3 and type levers 8 I have devised a unitary structure or cam unit which is illustrated on an enlarged scale in Figs. 5 to 9, inc. This cam unit comprises a lever which is made up of two side members 12 and 13 which are held in spaced relationship by the rivet 14, bearing stud 15 and pivot stud 16. The side member 13 is somewhat longer than the side member 12 and has a hole 17 therein for the purpose of receiving connecting link 18 that serves to join the free end of the cam unit through an interconnecting lever with the type lever 8. The pivot stud 16 serves to engage the hooks 19 on the mounting plate 20, which constitutes part of the framework of the machine. This method of engagement of the pivot pin 16 or the hook 19 is illustrated on an enlarged scale in Fig. 16. The bearing pin 15 serves to support what I term the operating member 21 but which is referred to in my patents hereinbefore mentioned as the elliptical member, that is to say the member 21 serves as the main operating means between the power driven member and the type levers. To the side member 12 is fastened a pair of studs 22 which pass through slots 23 in movable member 24, holding the member 24 to the side member 12 by means of enlarged heads 25. While the movable member 24 is shown as slidable, it will be readily understood that the construction of the unitary device may be such that this member may be pivoted to the side members, but as shown the member 24 carries a pin 26 which is adapted to be engaged by the forked end 27 (see Fig. 10) of the arm 28, forming a part of key lever 3. The member 24 carries near its outer extremity two stops 29 and 30. These stops are used to cooperate with the pins 31 and 32 in the operating member 21 as will be presently pointed out. Pivoted to the side member 13 as by means of a pin 33 is a lever 34 normally held in the position shown in Fig. 6 by means of a tension spring 35, one end of which engages a pin 36 riveted or otherwise fastened to the side member 13. As shown in Fig. 6, the member 34 rests against either the stud 37 or stud 38, depending on the position of the member 21. These studs 37 and 38 project outward to the right, looking at Fig. 5, from the member 21, while the pins 31 and 32 project to the left or from the backside of member 21 looking at Fig. 6. When the member 21 is in what I term normal or set position, the movable member 24 is in the position shown in Fig. 8 and the stop pin 32, which is flattened off as indicated by the line 39, rests against the stop 30 under the tension applied by member 34 bearing against the pin 37. Now, when the member 24 is moved to the position shown in Fig. 7, the stop 30 is pushed from under the flat portion 39 of either the pin 32 or 31, and the member 21 is released, and due to the pressure of member 34 against one of the pins 37 or 38, the member 21 is rotated to the position shown in Fig. 7 whereby it comes into engagement with the driven member or roll 40 which preferably has a suitable engaging surface 41 of soft rubber or other equivalent material. The engagement of the member 21 with either of the rolls 40, depending on what member is operated, immediately starts the member 21 to rotate in the direction of the arrow (Fig. 7) and at the same time the entire unitary structure is swung about the pivot 16 actuating through the link 18, the type bar 8.

It will be observed by reference to either Figs. 10 or 11 that the actuation of the key lever 3 serves to operate the arm 28 which is bifurcated at 27, the bifurcated portion engaging the pin 26 on the movable member 24.

Directly after the rotation of the member 21 is started, and the type bar operated, the member 21 is caused to complete a part revolution and the stop pin 31 either engages the stop 29, if the movable bar has not, due to the speed of operation returned to its full normal position as indicated in Fig. 8, or the stop 30, if the movable bar 24 has been returned to full normal position.

As will be seen by reference to Fig. 1, the unitary interconnecting devices are shown mounted in two rows (only those at the end being shown), and by disconnecting the links 18 which are preferably spring held in position as by a clamp such as shown in Fig. 30, which consists of two parts, one a portion 90 having a pin 91 which is adapted to enter the hole 17, and a spring 92 which assists in holding the pin in position. The unitary structures may be then unhooked from the hooks 19 and quickly removed for any inspection or for cleaning purposes if necessary or for the purpose of getting at the rollers 40. This quick detachable feature is more particularly shown in Fig. 16, in which it will be seen that the pin 16 is milled off on one side so that when the unitary interconnecting device is in the dotted position, the pin will just slip through the throat to the hook 19, but when the device is turned to its operating position as shown in Fig. 1, the pin 16 is then in the position which prevents it from passing through the throat to the hook 19, thereby preventing the interconnecting device from being accidently displaced from its pivoted mounting. As shown in Figs. 27 and 28, the member 21 is indicated as being made from a punching, but in either case I prefer to use teeth or serrations 42 in order to assure a non-slipping grip of the member 21 on the surface 41 of the roller 40.

In the modified form of unitary structure shown in Figs. 24 to 26, inclusive, the principle of operation is the same as has been described with reference to the form shown in Figs. 5 to 8, inc. and incorporates the idea of escapement shown and described in my Patent 1,227,846, hereinbefore referred to, into a unitary structure similar to the form in Figs. 5 to 8, inclusive, so that any detailed description of this particular form does not appear to be necessary. Likewise the form shown in Fig. 29 is a unitary structure but with one of the side members removed to show the operating parts more clearly. In this modified form, however, the roller 40 is positioned so that it is in front instead of behind the members 21.

I prefer to mount the plates 20 with the unitary interconnecting devices and roll 40 on a substructure 43 that is fastened to and forms a continuation of the regular frame 1 of the typewriter, although it is clearly within the scope of my invention to make the frame of the typewriter so as to take all of the parts, without using what I refer to as the substructure. Fastened to this substructure, and as shown on the backside thereof, is an electric motor 44 connected in any suitable manner, as by means of pulleys 45 and 46 and belt 47, to driving rolls 40, pulleys 48, 49 and belt 50 being used to complete the drive. While I have shown pulleys and belts, it is to be understood that any satisfactory connecting means may be utilized. The pulleys 46, 48 and 49 are preferably concealed by a suitable cover 51.

Figure 3:
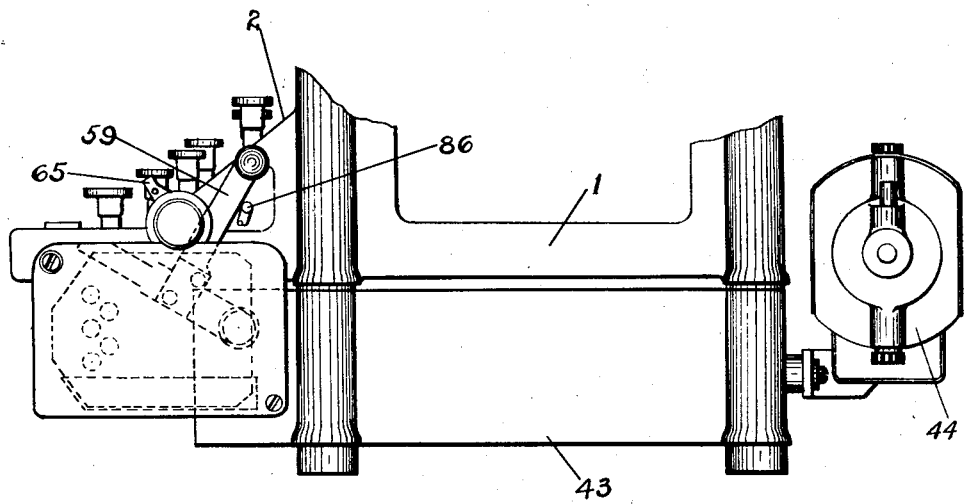
Figure 3 is a partial end view of the machine opposite to that shown in Fig. 2 showing particularly at the left the motor control means, both views 2 and 3 showing the substructure under the main portion of the typewriting machine.
Figure 4:
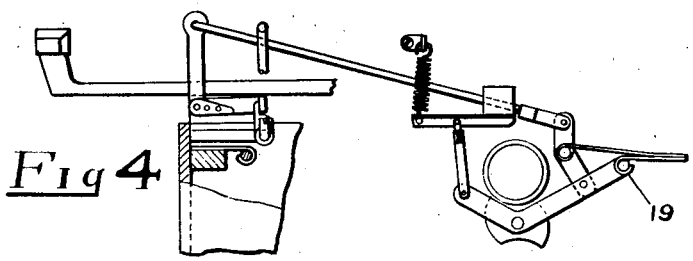
Figure 4 shows on a reduced scale the spacing bar and one of the unitary structures for its actuation.

Mounted on the substructure 43 in any suitable manner, as by means of screws passing through the screw holes 52 is a casing 53 having a back plate 54. Within the casing 53 is mounted a rheostat 55 carrying suitable resistance 56 having taps brought out to contacts 57. Engaging the contacts 57 is a lever arm 58 that is adapted to be actuated by a handle 59, whose end protrudes through the casing. As will be seen the cover 54 has clearance holes 71 and 72 which pass therefor the studs 73 and 74 which pass therethrough to engage fixed insulated contacts on the block 75 from which the circuit is extended to the motor 44. Mounted on the top part of the casing 53 in any suitable manner as by screws through the screw holes 66 is a block 60 in which is mounted a barrel 61 having a thumb nut 62. One end of the thumb nut is threaded at 63 to receive nut 64 and to hold in position on the barrel 61, a lever arm 65. The lever arm 65 carries a stud 67 and an indicating pin 68. The pin 67 is adapted to engage the holes 69 in the block 60, a spring 70 being used to control or hold the pin 67 in any one of the holes 69 in which it may be placed, by pushing in on the thumb nut 62 and rotating the lever 61 to the desired position, which may be indicated by the pin 68 (see Fig. 18). It will be observed by reference to Figs. 3 and 18 that the lever arm 65 controls the position of the rheostat handle 59, thereby determining the amount of resistance which may be used in the control circuit of the electrical operating device or motor. It will also be understood that when the lever 65 is turned to the extreme right instead of to the left as shown in Fig. 3, the rheostat lever 59 will be locked in the "off" position and when set in any of the other positions the speed of the driven members or rolls 40 through the power applied to the type bars, is limited or controlled.

If no provision were made for locking the key levers, and consequently the type levers when the power was cut off from the motor, difficulty might be encountered by depression of a number of the key levers, thereby dropping the members 21 into contact with the rollers, whereby when the power was turned on, the motor would be overloaded by the drag on the rollers 40, or if the rollers would turn, the type bars would become jammed in their effort to strike the platen at the same time. To overcome this difficulty, I have arranged a control lever consisting of a rod 76 pivoted to the frame of the typewriter. Movably carried on this rod 76 is a U-shaped member 77 being positioned thereon by the collars 78. The member 77 along its top part is L-shaped and has a lug 79 to engage an arm 80; arm 80 being positioned on the rod 76 by the collar 81. A spring 82 is used to restore the member 77 to its normal position as shown in Fig. 14 when the operating force is removed. The operating force is applied to the rod 76 through the medium of a pin 83 fastened to one of the collars 78 and the lever arm 84 carried on a rod 85 terminating in a lever arm 86 which projects through the framework 1 in the path of movement of the handle 59 of the rheostat so that when the rheostat handle 59 is thrown to the "off" position, the lever arm 86 is thrown over so as to actuate the member 77, moving it to the position shown in Fig. 15, whereby the edge passes under the hook 87 on each of the key levers. It will be observed too that when the lever 65 is thrown over to lock the rheostat handle 59 in "off" position it also locks the control lever 77 in the position shown in Fig. 15. On moving the lever 65 to the position desired for operating and following this by the movement of the rheostat handle 59 to the first circuit closing position, releases the operating force on the lever 86 and due to the operation of the spring 82 the locking bar 77 will be returned to normal position as shown in Fig. 14, whereby the key levers are then placed in position to be operated. Figure 13 indicates the application of the locking means to the spacing bar through the medium of the stop lever 88 which passes under a block 89 between a portion of the spacer bar.

In order that the work done on the printed sheet by the type bars may be uniform, I provide means for regulating the position of member 21 with respect to the driving roll. This is done through the medium of an adjustment of the portion 90 (see Fig. 30) with respect to part 93, screw threads being shown for the purpose, by which the length of link 18 may be varied and consequently the position of the unitary structure carrying member 21.

It will be understood that such views as Figs. 4 and 10 to 15, inc. are somewhat diagrammatic in order to clearly indicate what is intended to be accomplished and I, therefore, wish it to be understood that the details for carrying out my invention may be varied through a considerable range of equivalents, as will be apparent to one skilled in this art, hence I do not wish to be limited, except as through the scope of the appended claims.

Having thus described my invention, what I claim is:

1. In a power mechanism for a typewriter or the like a frame work having a roller supported on the frame, a key lever and a type bar on said frame and inter-connecting means between said lever and bar including a cam unit, said cam unit comprising a lever consisting of a pair of side members spaced apart for the major portion of their length, a cam journalled therebetween, a stop member located between the side members for normally holding said cam out of engagement with said roller, said stop member being actuated by the key lever for releasing the cam and means carried by the cam lever for moving said cam into operative engagement with the roller for the purpose described.

2. In a power mechanism for a typewriter or the like a frame work having a roller supported on the frame, a key lever and a type bar on said frame, and inter-connecting means between said lever and bar including a quickly removable cam unit pivoted to a part of the frame work and having one end free to move to actuate the type bar, said cam unit comprising a lever consisting of a pair of side members spaced apart for the major portion of their length, a cam journalled therebetween, a stop member for normally holding said cam out of engagement with said roller, said stop member being actuated by the key lever for releasing the cam and a spring pressed member carried between the side members of the cam lever for moving said cam into operative engagement with the roller for the purpose described.

3. In a typewriting machine, having a framework with a driven part supported on the frame, a key lever and a type lever on said machine and interconnecting means between said levers including a movable unitary device pivoted to a part of said framework and interconnected at one end with the type lever, said unitary device having support members carrying an operating member and means for normally holding said operating member out of engagement with said driven part, another member actuated by the key lever for releasing the holding means and tension means carried on and forming a part of the unitary device for moving said operating member into engagement with the driven part for the purpose described.

4. In a typewriting machine, having a framework with a driven part supported on the frame, a key lever and a type lever on said machines and interconnecting means between said levers including a readily removable unitary device hooked to a part of said framework and interconnected at one end with the type lever, said unitary device having; an operating member and means for normally holding said operating member out of engagement with said driven part, another member actuated by the key lever for releasing the holding means and means carried on the unitary device and forming a part thereof for moving said operating member into engagement with the driven part for the purpose described.

5. A unitary device, for interconnecting the key and type levers on a typewriting machine having a power driven part, comprising a pair of side members held together in spaced relationship and adapted to have one end connected to a type lever, and another portion to the framework of the machine, an operating member pivotally supported between said side members and adapted to be acted on by said power driven part, a movable member for controlling the operating member and carried between said side members and adapted to be actuated by said key lever and a tensioning device to give an initial movement to said operating member after it has been released by said movable member to bring it into position to cooperate with said power driven part as described.

6. A unitary device for interconnecting the key and type levers on a typewriting machine having a power driven part, comprising a pair of side members held together in spaced relationship and adapted to have one end connected to a type lever and another portion to the framework of the machine, an operating member pivotally supported between said side members and adapted to be acted on by said power driven part, a movable member carried between said side members having stops to arrest the rotation of said operating member at correct interval and adapted to be actuated by said key lever and a tensioning device to give an initial movement to said operating member, after said stops have been removed, to bring it into position to cooperate with said power driven part.

7. A unitary device for interconnecting the key and type levers on a typewriting machine having a power driven part, comprising a pair of side members held together in spaced relationship and adapted to have one end connected to a type lever and another portion to the framework of the machine, an operating member rotatably supported between said side members and having a pair of working surfaces adapted to be alternately acted on by said power driven part, a movable member for controlling said operating member and actuated by said key lever and a tensioning device to bring one of said working surfaces, of the operating member after it has been released by said movable member, into position to cooperate with said power driven part as described.

8. A unitary device for interconnecting the key and type levers on a typewriting machine having a power driven part, comprising a pair of side members held together in spaced relationship and adapted to have one end connected to a type lever and another portion to the framework of the machine, an operating member rotatably supported between said members and having at least one working surface farther from its center of rotation than the rest of the member, said working surface adapted to be acted on by said power driven part, a movable member controlling the operating member and actuated by said key lever and a tensioning device to bring said working surface of the operating member, after it has been released by said key lever and movable member, into position to cooperate with said power driven part as described.

9. A unitary device for interconnecting the key and type levers on a typewriting machine having a power driven part, comprising a pair of side members held together in spaced relationship and having one end connected to a type lever and another portion pivoted to the machine frame work, an operating revoluble member supported between said side members, and having control pins, a movable member operatively supported between said side members and connected to a key lever, stops on said movable member to engage said pins at the proper time and disengage on the depression of a key lever, and a tensioning device acting on said revoluble member to move it, when disengaged from said stop, into operative contact with said power driven part for the purpose described.

10. A unitary device for interconnecting the key and type levers on a typewriting machine having a power driving part, comprising a pair of side members held together in spaced relationship and having one end connected to a type lever and another portion pivoted to the machine framework, an operating revoluble member supported between said side members and having eccentrically disposed working surfaces and control pins, a movable member operatively supported between said side members and connected to a key lever, stops on the movable member to engage said pins at the proper time and disengage on the depression of a key lever and a tensioning device acting on said revoluble member to move it, when disengaged from said stop, so one of said working surfaces will come into operative contact with said power driven part for the purpose described.

11. In a typewriting machine having a framework with a driven part supported on the frame, a key lever and a type lever on said machine, said key lever having a forked end and interconnecting means between said levers including a unitary device having: support members carrying an operating member normally held out of engagement with said driven part, a detent member having a part to enter the forked end of the key lever and actuated by said key lever for releasing the holding means, and means for moving said operating member into engagement with the driven part for the purpose described.

12. In a typewriting machine having a frame carrying a series of key and type levers, an electric motor mechanically connected with the frame, support plates having hooks, a series of interconnecting unitary devices pivotally held by said hooks, said devices serving to connect the key and type levers and each having a part operated by a key lever and another part acted on by a roller driven by the motor whereby a type bar is actuated.

13. In a typewriting machine having a frame carrying a series of key and type levers, an electric motor mechanically connected with the frame, support plates having hooks, a series of quickly detachable interchangeable, interconnecting unitary devices pivotally held by said hooks, in such a manner that said devices cannot unhook during normal operation, but can be readily unhooked, when turned to the proper angle, said devices serving to connect the key and type levers and each having a part of little inertia operated by a key lever, and another part acted on by a roller driven by the motor whereby a type bar is actuated.

14. In a typewriting machine, a frame carrying a series of key and type levers, a substructure for the frame, an electric motor and means for controlling the speed of the same all carried on the substructure and a series of interchangeable interconnecting devices mounted in two rows on plates supported by the substructure, said devices serving to connect the key and type levers and each having a part operated by a key lever and another part acted on by a roller driven by the motor whereby a type bar is actuated.

15. In a typewriting machine, a frame carrying a series of key and type levers, a substructure for the frame, a pair of support plates carried by the substructure and having hooks, a series of interconnecting unitary devices pivotally held by said hooks, said devices serving to connect the key and type levers, and each having a part operated by a key lever and another part to cause the device to actuate a type lever, an electric motor and means operated by the electric motor for acting on said part for causing the actuation of a type lever.

16. In a typewriting machine, a frame carrying a series of key and type levers, a substructure for the frame, a pair of support plates carried by the substructure and having hooks, a series of interconnecting unitary devices pivotally held by said hooks, each of said devices having a pivot pin so formed as to engage its hook only at an angle different from its operating angle, said devices serving to connect the key and type levers and having means brought into action by a key lever for actuating a type lever and motor operated means for acting on said type lever actuating means for the purpose described.

17. In a typewriting machine, a frame carrying a series of key and type levers, a substructure for the frame, a pair of support plates carried by the substructure and having integral hooks formed from said plates, a series of interchangeable interconnecting unitary devices pivotally held by said hooks, said pivot connection being such that the unitary devices cannot unhook during normal operation but can be unhooked when turned through a considerable angle, said devices serving to connect the key and type levers and having means brought into action by a key lever for actuating a type lever and motor operated means for acting on said type lever actuating means for the purpose described.

18. In a typewriting machine, a frame carrying a series of key and type levers a substructure for the frame, a pair of support plates carried by the substructure and having integral hooks formed from said plates, a series of interchangeable interconnecting unitary devices pivotally held by said hooks, said pivot connection being such that the unitary devices cannot unhook during normal operation but can be unhooked when turned through a considerable angle, said devices serving to connect the key and type levers and having a part brought into action by a key lever for actuating a type lever, a driving roller for each row of devices supported on the substructure for action on said part for actuating a type lever and an electric motor supported on the substructure having means for driving said rollers for the purpose described.

19. In a typewriting machine, a series of key and type levers on said machine, a series of quickly removable interchangeable unitary devices interconnected between said key and type levers, said interconnection including: a spring clamp fastened to the type lever and engaging one end of the unitary devices, a sliding connection between the end of the key lever and a movable member on the unitary device and a hook on the machine to engage a part on the unitary device to form a pivotal bearing; power operated means for acting on a member of said unitary device to actuate its cooperating type lever, said movable member on the unitary device acting through said sliding connection on the key lever to place said power operated member in position to be acted on by the power means for the purpose described.

20. In a typewriting machine having a frame carrying a series of key and type levers and a driven part, said key levers having a forked end, support plates having hooks, a series of quickly detachable interconnecting unitary devices pivotally held by said hooks, said devices serving to connect the key and type levers and each having a part to slidably enter the forked end of said key bar to be actuated thereby and another part to be acted on by said driven part whereby a type bar is actuated.

21. In a typewriting machine having a series of key and type levers and a power driven part; a unitary device for interconnecting the key and type levers, including: supporting members held together and having a quickly detachable connection with a type lever and carrying an operating member adapted to be acted on by said power driven part, a movable element controlling the operating member carried between said supporting members and adapted to be actuated by a key lever having a sliding connection therewith, and means carried by the support members for giving an initial movement to said operating member after it has been released by said movable element to bring it into position to cooperate with said power driven part.

22. In a typewriting machine, a series of type bars, a single electrically operated device for actuating said bars and means for determining the amount of power transmitted from said device to said type bar. including: a rheostat connected in a circuit controlling said electrically operated device, said rheostat having a manually controlled operating handle, together with another lever manually operable to engage the rheostat lever and positively limit the amount of movement of the rheostat lever in one direction.

23. In a typewriting machine, a series of type bars, a single electrically operated device for operating said bars and means for determining the amount of power transmitted by said device to the type bars, including: a rheostat connected in a circuit controlling said electrically operated device, said rheostat having a manually controlled operated handle, together with another lever manually operable to engage the rheostat lever to lock the same in "off" position and to limit the amount of movement of the rheostat lever in "on" position.

24. In a power mechanism for a typewriter or the like, a series of type bars, a series of key levers operatively connected with said type bars, a single electrically operated device for actuating said type bars, a switch connected in a circuit controlling said electrically operated device, means mounted entirely separate from the switch, but actuated on operation of the switch for locking said series of key levers on the actuation of said switch to cut off power to said electrically operated device.

25. In a power mechanism for a typewriter or the like, a series of type bars, a series of key levers operatvely connected with said type bars, a single electrically operated device for actuating said type bars, a switch connected in a circuit controlling said electrically operated device, means mounted entirely separate from the switch, but actuated on operation of the switch for locking said series of key levers on the actuation of said switch to cut off power to said electrically operated device, and means for restoring said first mentioned means to normal position on actuation of said switch to apply power to said device.

26. In a power mechanism for a typewriter or the like, a series of type bars, a series of key levers operatively connected with said type bars, a single electrically operated device for actuating said type bars, a switch connected in a circuit controlling said electrically operated device, means mounted entirely separate from the switch, but actuated on the operation of the switch for locking said series of key levers on the actuation of said switch to cut off power to said electrically operated device, and means separate from the switch for locking both the first mentioned means and switch in inoperative position.

27. In a typewriting machine, a series of interconnected key levers and type bars, a single electrically operated device for actuating said bars, a rheostat connected in a circuit controlling said electrically operated device, means for rendering said key levers inoperative by the actuation of the rheostat to "off" position.

28. In a typewriting machine, a series of interconnected key levers and type bars, a single electrically operated device for actuating said bars, a rheostat connected in a circuit controlling said electrically operated device, means for rendering said key levers inoperative by the actuation of the rheostat to "off" position, and means for placing the key levers in operative condition on the actuation of said rheostat to "on" position.

29. In a typewriting machine, a series of interconnected key levers and type bars, a single electrically operated device for actuating said bars, a rheostat connected in a circuit controlling said electrically operated device, means for rendering said key levers inoperative by the actuation of the rheostat to "off" position, and means for locking both the key levers and rheostat in inoperative position.

30. In a typewriting machine, a series of interconnected key levers and type bars, a single electrically operated device for actuating said bars, a rheostat connected in a circuit controlling said electrically operated device, means for rendering said key levers inoperative by the actuation of the rheostat to "off" position, and means for locking both the key levers and rheostat in inoperative position, said last mentioned means also serving to limit the amount of actuation of the rheostat toward "on" position for determining the amount of power transmitted from said device to the type bars.

31. In a typewriting machine, a series of key and type levers, a single electrically operated device for actuating said type levers, a rheostat connected in a circuit controlling said electrically operated device, said rheostat having a manually controlled operating handle, a common lever bar for locking all of said key levers so they cannot be actuated, a lever for actuating said common lever and positioned so as to be operated by the actuation of said rheostat handle.

32. In a typewriting machine a series of key and type levers, a single electrically operated device for actuating said type levers, a rheostat connected in a circuit controlling said electrically operated device, said rheostat having a manually controlled operating handle, a common lever bar for locking all of said key levers so they cannot be actuated, a lever for actuating said common lever and positioned so as to be operated by the actuation of said rheostat handle, and a common means for locking said actuating lever and rheostat handle so neither can be accidentally moved while current is cut off from said electrical operating device.

33. In a typewriting machine, a series of key and type levers on said machine, a series of quickly removable interchangeable unitary devices interconnected between said key and type levers, said interconnection including; a spring clamp fastened to the type lever and engaging one end of the unitary devices, a sliding connection between the end of the key lever and a movable member on the unitary device and a hook on the machine to engage a part on the unitary devices to form a pivotal bearing; power operated means for acting on a member of said unitary device to actuate its cooperating type lever, said movable member on the unitary devices acting through said sliding connection on the key lever to place said power operated member in position to be acted on by the power means, and means for adjusting the length of said spring clamp where it is fastened to the type levers as and for the purpose described.

34. In a typewriting machine, a frame, a series of type levers carried on said frame, separate operating members for actuating said type levers, an electric motor supported by said frame, rotatable means driven by the motor for operating said type levers with means for causing the operating members to engage the rotatable means, a casing mounted on the frame and enclosing a rheostat having an operating handle extending through the casing, said rheostat being electrically connected to control the operation of the motor, a lever support on the casing and a manually operable spring controlled lever having definitely fixed positions for determining the extent of movement of said rheostat handle, means for preventing the operating members from engaging the rotatable means, said preventing means being operated by said spring controlled lever.

35. In a typewriting machine, a frame, a series of type levers carried on said frame, separate operating members for actuating said type levers, an electric motor supported by said frame, rotatable means driven by the motor for operating said type levers, key levers interconnected with said type levers through means released by the key levers whereby the operating members are caused to engage said rotatable means, a rheostat mounted on the frame and electrically connected to control through the motor the speed of operation of the type levers, and a lever pivoted to said frame for simultaneously locking all of said key levers so said releasing means cannot be operated as and for the purpose described.

36. In a typewriting machine, a frame, a series of type levers carried on said frame, separate operating members for actuating said type levers, an electric motor supported by said frame, rotatable means driven by the motor for operating said type levers, key levers interconnected with said type levers through means released by the key levers whereby the operating members are caused to engage said rotatable means, a rheostat mounted on the frame and electrically connected to control through the motor the speed of operation of the type levers, and a lever pivoted to said frame for simultaneously locking all of said key levers so said releasing means cannot be operated, said pivoted lever being actuated by the operation of said rheostat from "on" to "off" position.

37. In a typewriting machine, a frame, a series of type levers carried on said frame, separate operating members for actuating said type levers, an electric motor supported by said frame, rotatable means driven by the motor for operating said type levers, key levers interconnected with said type levers through means released by the key levers whereby the operating members are caused to engage said rotatable means, a rheostat mounted on the frame and electrically connected to control through the motor the speed of operation of the type levers, and a lever pivoted to said frame for simultaneously locking all of said key levers so said releasing means cannot be operated, said pivoted lever being actuated by the operation of said rheostat from "on" to "off" position, and means for simultaneously locking said pivoted lever in key locking position and the rheostat in "off" position.

38. A unitary device for interconnecting the key and type levers on a typewriting machine having a power driven part, comprising; supporting members held together and connected to a type lever and carrying an operating member adapted to be acted on by said power driven part, an element controlling the operating member carried entirely by said supporting member so as to move horizontally with respect thereto and adapted to be actuated by a key lever and means carried by said supporting members for giving an initial movement to said operating member, after it has been released by said horizontally moving element to bring it into position to co-operate with said power driven part as described.

39. A unitary device for interconnecting the key and type levers on a typewriting machine having a power driven part, comprising; supporting members held together and connected to a type lever and carrying an operating member adapted to be acted on by said power driven part, a slidable member carried by said supporting members and having escapement catches in the path of movement of the operating member, said slidable member being moved by a key lever and means for giving an initial movement to said operating member, after it has been released by one of said catches, to bring it into position to cooperate with said power driven part as described.

40. A unitary device for interconnecting the key and type levers on a typewriting machine having a power driven part, comprising; supporting members held together and connected to a type lever and carrying an operating member adapted to be acted on by said power driven part, means for adjusting the length of union between said supporting members and a type lever, a slidable member carried by said support members and having means for holding the operating member, said slidable member being operated by a key lever and means for giving the operating member an initial movement, after the slidable member has been withdrawn from holding engagement therewith, to bring it into position to be acted on by said power driven part.

41. In a typewriting machine, the combination, with type members, a constantly movable power-member, and key-controlled means for connecting the type-members selectively with the power-member, of manually operable means for throwing the power-member into and out of operation; and locking-means separate from said manually-operable means but operated thereby to prevent action of said key-controlled means, whenever the power-member is thrown out of operation.

42. In a typewriting machine, a constantly movable power-member, a series of type and key levers having interconnecting means; each including an operating member and a control member therefor; said control members being actuated by the key levers to connect an operating member and its coacting type lever with the power member, manually-operable means for throwing the power member into and out of operation and locking means operated coincident with said manually-operable means to prevent the actuation of said control members, whenever the power member is thrown out of operation.

43. In a typewriting machine, having a framework with a power driven part supported on the frame, a key lever and a type lever on said machine, and inter-connecting means between said levers including a device having at least one support member carrying a rotary operating member, a latch carried by said support member for holding said rotary operating member normally out of engagement with said driven part, said latch adapted to be acted on by the key lever for effecting a release of the latch from engagement with said rotary operating member and means carried entirely by said device for moving said rotary operating member into engagement with the power driven part.

44. In a typewriting machine having a frame work with a power driven part supported on the frame, a key lever and a type lever on said machine and inter-connecting means between said levers including a device having a pair of laterally spaced support members, an operating member rotatably mounted between said support members, a latch positioned at least in part between said support members for holding said rotary operating member normally out of engagement with said driven part, said latch being operatively engaged by a key lever for moving the latch to release said rotary operating member and means on the device itself for moving said rotary operating member into engagement with the power driven part.

45. In a power-driven typewriter, or the like, the combination, with a constantly rotary power-roller, a part to be actuated, and a manually operable key, of connections between the key and said part comprising; a pivoted power-lever, a cam rotatably mounted on the power lever, spring means, carried by said lever, tending normally to rotate the cam into engagement with the roller, a stop-member, carried by but movable with respect to said lever, normally preventing rotation of the cam, and connections between the stop-member and the key whereby operation of the key causes the release of the cam.

46. In power mechanism for a typewriter or the like, the combination of a power-lever; a pivotal support therefor; a cam journalled on the power lever and provided with a detent; a stop-member movably mounted on the power-lever and having a stop cooperative with said detent to control rotation of the cam; and a manually operable member articulated with the stop-member, for moving said member relatively to the power-lever, the point of articulation being located close to the pivotal support of the power lever.

47. In power mechanism for a typewriter or the like, the combination of a power-lever; a pivotal support therefor; a cam journalled on the power-lever and provided with a detent; a stop-member movably mounted on the power-lever and having a stop cooperative with said detent to control rotation of the cam; a manually operable member cooperative with the stop member to move the same upon the power-lever, the stop member and the manually operable member having relatively slidable interengaging surfaces extending in the general direction of the arcuate movement of the stop-member resulting from pivotal movement of the power-lever, and the cooperative movement of said members being at an angle to the direction of such arcuate movement.

48. In power mechanism for a typewriter or the like, the combination of a power-lever; a pivotal support therefor; a cam journalled on the power-lever, at a point remote from said pivotal support, and provided with a detent; a stop-member movably mounted on the power-lever and having a stop cooperative with said detent to control rotation of the cam, the stop-member being provided also with a lateral projection, by which it may be actuated, located near said pivotal support; and a manually operable lever, pivoted at a point remote from said pivotal support and having a slot engaged by said lateral projection.

49. In power mechanism for a typewriter or the like, a power-unit comprising: a lever having two side-plates spaced apart through a part of their length; means, including two transverse pivots, for holding the side-plates in such spaced relation; a cam mounted to turn on one of said pivots, the other said pivot serving to mount the lever for pivotal movement; cam-controlling means movably mounted on and between the spaced parts of the side-plates; the side-plates, at one end of the lever being bent toward each other and secured together; and a link, pivoted to said end of the lever, for communicating motion therefrom.

In testimony whereof, I affix my signature.

JAMES FIELDS SMATHERS.